Aug. 25, 1953  W. F. KLEIN  2,650,138
BRAKE CYLINDER RELEASE VALVE
Filed July 5, 1951  2 Sheets-Sheet 1

William Frederick Klein, Inventor
By Dodge and Sons
Attorneys

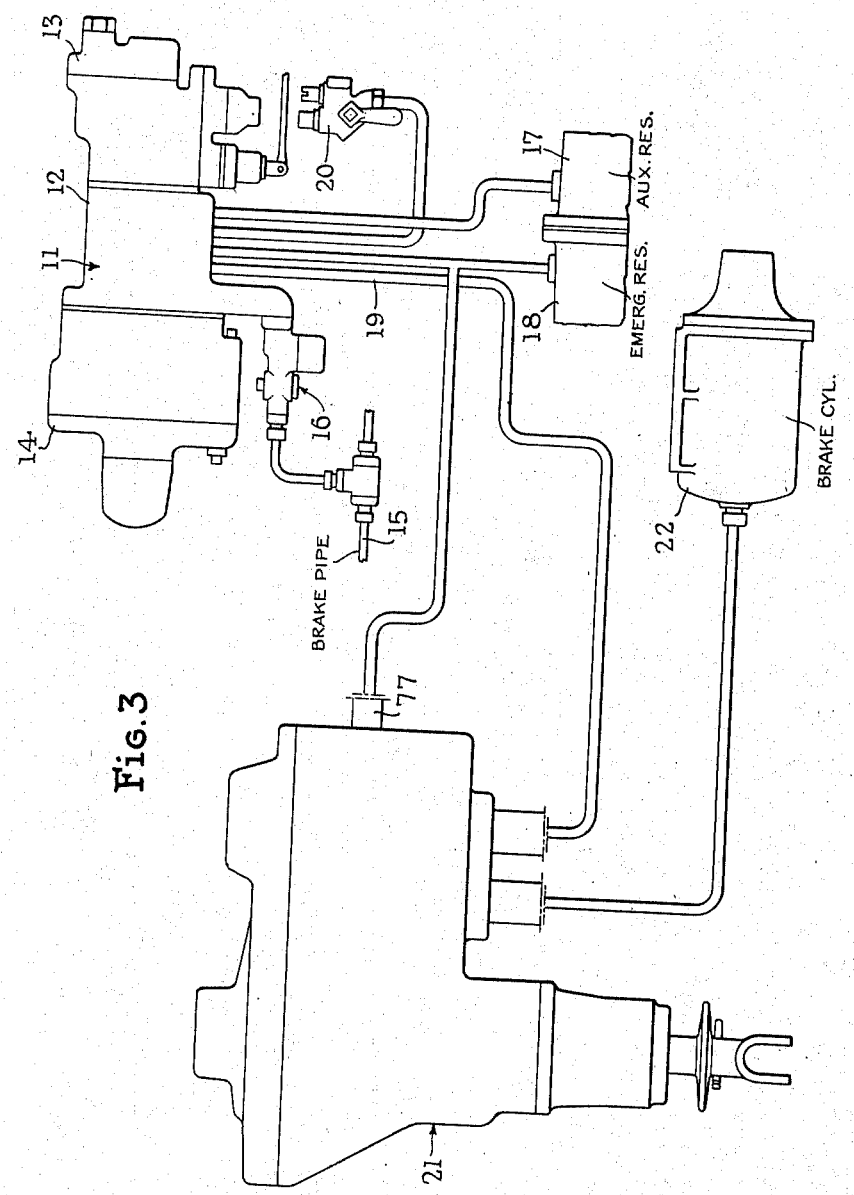

Patented Aug. 25, 1953

2,650,138

UNITED STATES PATENT OFFICE 2,650,138

BRAKE CYLINDER RELEASE VALVE

William F. Klein, Watertown, N. Y., assignor to The New York Air Brake Company, a corporation of New Jersey Application July 5, 1951, Serial No. 235,341

6 Claims. (Cl. 303—68)

This invention relates to release valves primarily intended for use in releasing the brakes on cars preparatory to setting them out of a train for switching operations. Specifically, it is an improvement upon the release valve shown in Pickert Patent No. 2,302,377, dated November 17, 1942, and the later Pickert Patent No. 2,392,185, dated January 1, 1946. Each of these patents has been assigned to applicant's assignee.

The invention is concerned with a release valve which is adapted for inter-position between the brake cylinder connection leading from a conventional control valve and the brake cylinder associated with that connection. It will be noticed that in each of the prior patents, the release valve mechanism is maintained in its abnormal or releasing position by means of a pressure motor which is normally inert. This pressure motor comprises a movable abutment having on either side thereof a working chamber, one of which is vented when the release valve is in its releasing position.

The working chambers are charged with pressure fluid flowing through the brake cylinder connection during a brake application. In each of the above mentioned patents the valve can be operated to release the brakes following any type of a brake application, i. e. a service application or an emergency application. In operating trains over long down-hill grades, it is common practice to retain a light application at all times. It is desirable, however, that the train braking system be kept completely charged at all times. Therefore, retaining valves are provided which function to retain a chosen pressure within the brake cylinders at all times.

Regardless of the setting of the retaining valve, the release valves such as are shown in the Pickert patents could be operated to dissipate the pressure in the brake cylinder. These valves would not re-set to restore normal operating conditions when the brakes were released, if the retaining valves were set to maintain pressure in the brake cylinders. This objection to the valves of this type may be overcome by modifying the Pickert valve as shown in applicant's earlier Patent No. 2,444,993, dated July 13, 1948.

During discussions of the operation of release valves of this type, the suggestion has been made that the accidental operation of the release valve by striking an obstruction to the right-of-way would create a dangerous condition which could be rectified only by release and reapplication of the brakes by the engineer. While this situation seems a remote possibility, the present invention provides a valve in which this possible objection is overcome.

The invention will be described as embodied in a release valve of the type shown in the Pickert Patent 2,392,185. It will be apparent that it could be embodied in a release valve of the type shown in the earlier Pickert patent.

According to the invention a by-pass connection is provided between the working spaces of the pressure motor which controls the release valve's function. Flow through this by-pass is controlled by a valve which is operated by a second pressure motor having working spaces which are normally differentially charged but in which the pressures are equalized when an emergency application is in effect. The valve is held open except when the motor pressures are balanced. This by-pass when open inhibits the creation of a pressure differential in the release valve motor, so that actuation of this motor is prevented and the release valve will not remain in its abnormal or brake cylinder venting position.

The invention will be described having reference to the accompanying drawings, in which:

Fig. 3 is a diagrammatic representation of the air brake equipment on a single freight car equipped with a releasing valve embodying the present invention.

Figures 1, 2:
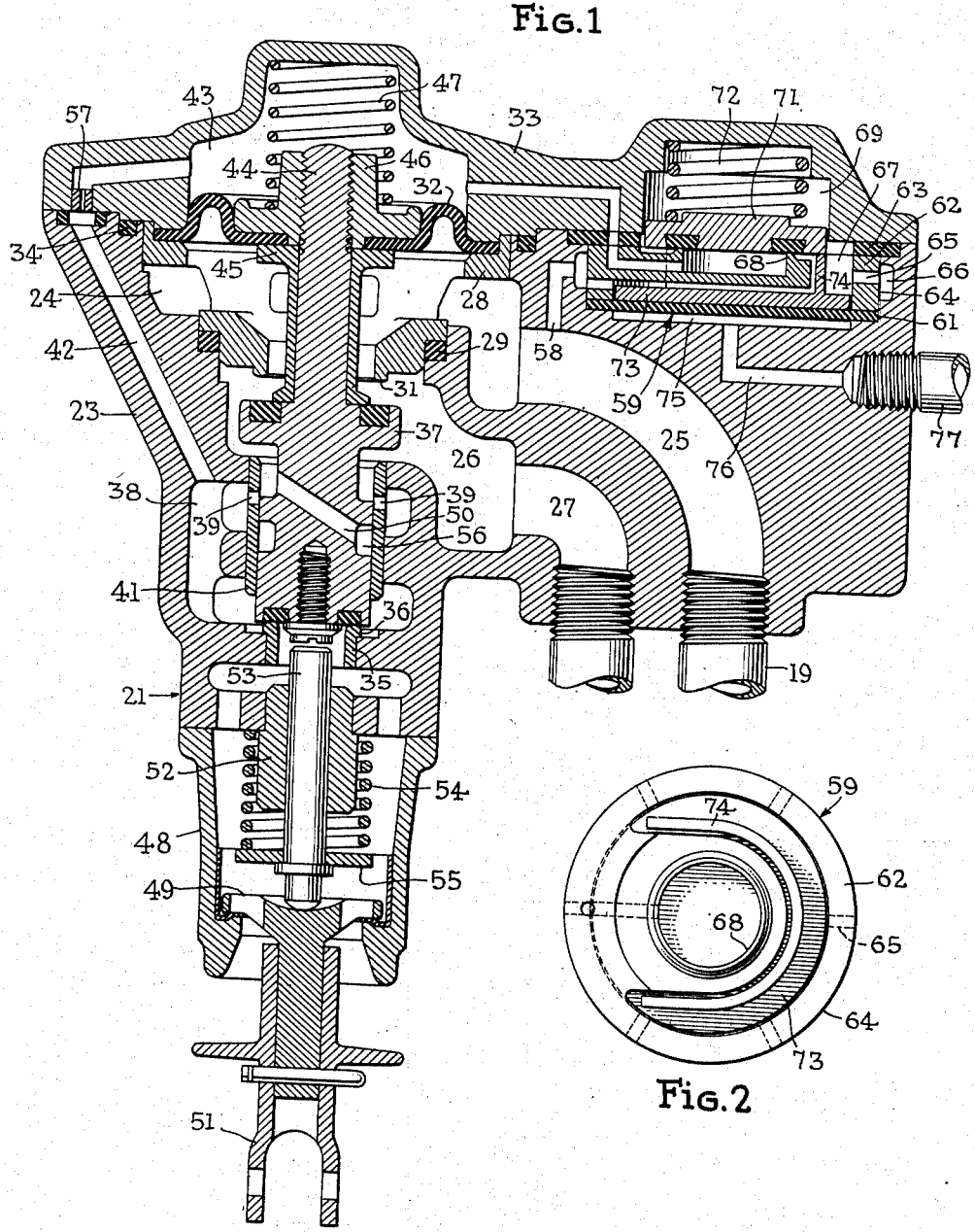
Fig. 1 is an axial sectional view of a preferred form of the invention.
Fig. 2 is a detail plan view of the pilot valve assembly.

The invention has been illustrated and will be described as it is used in conjunction with an AB brake which is conventional in freight service throughout the United States. It will be apparent that it could also be used in conjunction with other types of brake control valves and such use is contemplated.

Referring first to Fig. 3, reference numeral 11 generally indicates an AB type control valve. The control valve 11 comprises a pipe bracket portion 12, a service portion 13 and an emergency portion 14. The control valve 11 is supplied with pressure fluid through the brake pipe 15 and the combined cut-out cock and strainer assembly 16. Also leading from the pipe bracket 12 are the connections to the auxiliary reservoir 17 and the emergency reservoir 18.

The brake cylinder connection 19 extends from the pipe bracket 12 to the release valve mechanism generally indicated by the numeral 21. The brake cylinder 22 receives air from the connection 19 through the valve 21. Exhaust flow from the brake cylinder 22 passes from the connection 19 through appropriate ports in the control valve 11 to an exhaust line carrying the retaining valve 20.

Referring to Fig. 1, the body portion 23 of the release valve 21 encloses a chamber 24 which is in direct communication with an inlet passage 25 connected to the brake cylinder connection 19 and a chamber 26 which is in direct communication through a passage 27 with a pipe leading to the brake cylinder 22. Mounted in chamber 24 is a spider 28. A gasket 29 is provided to prevent leakage around the periphery of spider 28 into the chamber 26. A valve seat 31 is formed on the lower face of the spider 28.

A slack diaphragm 32 is clamped at its periphery between the upper face of the spider 28 and the lower face of the cap 33 of the release valve. Leakage between the cap 33 and housing 23 is prevented by the gasket 34. Provided in the lower portion of the body 23 is a bushing 35 having at its upper edge a valve seat 36. A double beat poppet valve 37 is reciprocable between an upper abnormal position in which it seats against the valve seat 31 and a lower normal position in which it seats against the valve seat 36.

Chamber 26 is in communication with a chamber 38 through the ports 39 in a bushing 41. A passage 42 extends upwardly from the chamber 38 to a working space 43 defined between the cap 33 and the slack diaphragm 32. Valve 37 is provided with a stem 44 which extends upwardly through an opening in the center of the diaphragm 32. The inner periphery of the diaphragm 32 is retained between a flanged sleeve 45 which encircles the stem 44 and a threaded member 46. The member 46 also serves as a spring seat for the coil compression spring 47 the other end of which reacts against the cap 33.

Attached to the lower end of the body 23 is a housing 48 which sustains the universally tiltable ported head 49 of the forked lever 51. Pressed into the lower end of the body 23 is a guide bushing 52 in which the stem 53 is reciprocable. The stem 53 is biased downward by a coil compression spring 54 reacting between the housing 23 and spring seat 55 attached to the stem 53. When the lever 51 is moved in any direction, the universally tiltable head 49 moves the stem 53 upwardly forcing the valve 37 to its upper position in which it seats against the valve seat 31 which isolates the chamber 24 from the chamber 26.

In the upper position of the valve, the diagonal port 50 through the valve 37 is placed in communication with chamber 38 through the ports 39 and the annular recess 56. Thus, the chamber 26 is vented to atmosphere through the chamber 38 and the ports provided in the universally tiltable head 49. At the same time the working space 43 is vented to atmosphere through the passage 42 which is in communication with the chamber 38. The valve 37 is maintained in its uppermost position by the pressure in the chamber 24 which reacts on the diaphragm 32 to overcome the downward bias of spring 47.

The apparatus described above is entirely conventional and no claims are directed to it apart from the particular improvement afforded by the present invention.

According to the present invention the passage 42 is provided with a choke 57 whereby the working space 43 is vented to atmosphere at a restricted rate when the vent valve is opened by manipulation of the lever 51. A by-pass 58 is afforded between the passage 25 and the working space 43. Flow through the by-pass 58 is controlled by a valve assembly 59. The valve assembly 59 comprises a flexible diaphragm 61 which is retained in a recess in the housing 23 by a valve seat member 62.

The upper surface of the valve seat member 62 is provided with a gasket 63. The diaphragm 61, the valve seat member 62 and gasket 63 are clamped as an assembly between the housing 23 and the cap 33. The valve seat member 62, as best seen in Fig. 2, comprises an outer annular portion 64 which is provided with radial ports 65 whereby fluid pressure may be admitted from the annular recess 66 to the generally U-shaped chamber 67 which embraces the valve seat 68, as shown in Fig. 1.

Cap 33 is provided with a bore 69 in which is reciprocable a disc valve 71 which is biased toward its closed position by a coil compression spring 72 which reacts between the disk valve 71 and cap 33. Clearance is provided between the bore 69 and valve 71 so that the bore 69 and chamber 67 are charged at the same pressure. Mounted on the diaphragm 61 is a follower member 73. This follower 73 is provided with a generally U-shaped projection 74 adapted to engage at least a portion of the outer periphery of the disk valve 71. The working space 75 defined between the diaphragm 61 and housing 23 is connected by a passage 76 with a pilot pressure connection 77.

As shown in Figure 3 the pilot connection 77 extends between the release valve 21 and the emergency reservoir 18.

When the control valve 11 is in its normal running position, the brake pipe 15, the auxiliary reservoir 17 and the emergency reservoir 18 are charged to the same pressure. With the control valve 11 in this position, the brake cylinder 22 is in communication with the exhaust connection on which the retaining valve 20 is mounted. This retaining valve may be set to retain a chosen pressure in the brake cylinder from a previous application of the brakes. With the control valve 11 in running position the diaphragm 61 will be subject to the unbalanced pressures existing in the emergency reservoir 18 and in the brake cylinder connection 19. The disk valve 71 is unseated under this condition, whereby the by-pass 58 is open.

If a service application is made by operation of the engineer's brake valve, not shown, a controlled reduction of the brake pipe pressure to a chosen pressure will result. This reduction of the brake pipe pressure will condition the service portion 13 of the control valve to admit pressure fluid from the auxiliary reservoir 17 to the brake cylinder 22. The amount of pressure fluid thus admitted to the brake cylinder 22 is controlled by either of two limiting factors. When less than a full service application is made, the auxiliary reservoir pressure fluid continues to flow to the brake cylinder until its pressure falls slightly below brake pipe pressure at which time the control portion assumes what is known in the art as service lap position in which further flow to the brake cylinder is prevented. During a full service application of the brakes, the flow of pressure fluid continues until the pressures in the auxiliary reservoir and the brake cylinder have equalized. During a service application of the brakes, the emergency reservoir remains fully charged. This pressure is effective in the working space 75 to maintain the valve 71 open even though the pressure in the connection 19 rises to the maximum characteristic of a service application of the brakes.

If the lever 51 is manipulated when a service application of the brakes is in effect the valve 37 will be raised from its seat 36. The chamber 43 and the brake cylinder 22 are thus vented to atmosphere. This venting flow will continue so long as the valve 37 is held from its seat 36. However, if the lever 51 is released, the valve will return to its normal position against seat 36, because the flow of pressure fluid through the by-pass 58 prevents the creation of a pressure differential across the diaphragm 32 sufficient to overcome the bias of the spring 47.

During an emergency application of the brakes the brake pipe 15 is vented to atmosphere and both the auxiliary reservoir and the emergency reservoir 18 are placed in communication with the brake cylinder 22. The pressure in the cylinder 22 and in the two reservoirs is permitted to equalize. Thus during an emergency application of the brakes, the pressures acting on the diaphragm 61 are balanced. The spring 72 is therefore effective to close the valve 71 against its seat 68.

With an emergency application in effect, if the lever 51 is manipulated the valve 37 will be raised from its seat 36 as before. With the valve 37 in its raised position, the brake cylinder 22 and the chamber 43 are each vented to atmosphere. Since the disk valve 71 is closed as described above, a pressure differential is created across the diaphragm 32. This pressure differential overcomes the bias of spring 47 and acts to retain the double beat poppet valve 37 in its uppermost position. Thus when the lever 51 is released the valve 37 will not return to its normal position.

It will be noted that when the valve 71 is closed the pressure in the brake pipe connection 19 acts to retain the valve against its seat 68. When the valve 71 is open the pressures acting on the valve are in static balance. When the brakes are released following an emergency application the emergency portion 14 of the control valve 11 assumes the position known in the art as accelerated release position. With the emergency portion in this position the control valve is effective to permit a flow of pressure fluid from the auxiliary reservoir and brake cylinder back to the brake pipe.

If the release valve has been operated to vent the brake cylinder it is desirable that the release valve should not reset before the service portion has moved to its release position, a condition which is realized only after the accelerated release function is complete. Before the service portion 13 moves to release position the brake cylinder connection and the auxiliary reservoir are in open communication. If the release valve is restored to its normal position before the service portion moves to its release position, there will be a needless waste of air which will occur as a result of flow from the auxiliary reservoir to the vented brake cylinder. This undesirable condition can be prevented if the by-pass connection 58 does not open until the service portion has moved to release position.

During the emergency release function the pressure in the emergency reservoir remains the same. Therefore the pressures on the diaphragm 61 will become unbalanced as a result of flow from the brake cylinder connection to the brake pipe during accelerated release. However, the pressure in the brake cylinder connection 19 is not entirely dissipated during accelerated release but equalizes with the rising brake pipe pressure. By causing the pressure in the brake cylinder connection 19 to maintain the valve 71 closed in addition to the bias of the spring 72, the unbalance of the pressures acting on the diaphragm 61 during this time is rendered ineffective to open the valve 71. When the service portion moves to release position, the brake cylinder connection 19 is vented through the retaining valve 20. At the same time the emergency reservoir 18 is recharged from the brake pipe and the motor operated valve 71 is caused to resume its normal open position. Opening of the valve 71 and dissipation of the pressure in the connection 19 permits the valve 37 to return to normal position.

While the invention has been described in an embodiment in which the pressure in the emergency reservoir is used as the pilot pressure, it will be apparent that pressure fluid from some other source could be employed, the controlling factor being that the pressure in this source should remain constant unless an emergency application is in effect, at which time the pressure in this source should be dissipated at least in part so that valve 71 may close. No limitation to the precise embodiment of the invention is intended other than is expressed in the appended claims.

What is claimed is:

1. In a fluid pressure brake controlling system of the type including a control valve, a brake pipe, an auxiliary reservoir, an emergency reservoir, a brake cylinder, a brake cylinder connection from said control valve and a self-restoring brake releasing mechanism interposed between said connection and said cylinder, said mechanism having a main valve having a normal position in which it permits flow between said connection and said cylinder and an abnormal position in which it seals said connection and vents said cylinder, fluid pressure motor means effective when actuated to maintain said valve in abnormal position, said motor means comprising in combination a movable abutment separating first and second working spaces; biasing means urging said abutment toward said first working space; a by-pass between said working spaces; a pilot valve controlling flow through said by-pass; an expansible chamber motor normally conditioned to maintain said pilot valve open, said motor having a first and a second working chamber separated by a movable wall, said first working chamber being in free communication with said connection, said second working chamber being in free communication with said emergency reservoir; yielding means urging said pilot valve toward closed position and effective to close said pilot valve when the pressures in said connection and said emergency reservoir equalize; and valve means whereby said second working space may be vented.

2. The combination defined in claim 1 in which the pressure in said connection reacts on said pilot valve when closed, in addition to said yielding means, to maintain that valve closed, until said control valve releases the pressure in said connection.

3. In a self-restoring brake releasing mechanism, interposed between the brake cylinder connection of a brake controlling valve and the brake cylinder of a fluid pressure braking system, said mechanism being of the type including a release valve shiftable between a normal position in which flow between said connection and said cylinder is permitted and an abnormal position in which it seals said connection and vents said cylinder, said valve being maintained in said abnormal position by actuation of a normally inert pressure motor, said pressure motor comprising in combination a movable abutment connected to said release valve and having on its opposite faces a first and a second working space; means biasing said abutment toward said first working space, the first working space communicating with said connection; a by-pass between said working spaces; a pilot valve in said by-pass; yielding means urging said pilot valve closed; an expansible chamber motor normally effective to maintain said pilot valve open and having a first working chamber in communication with said connection and a second working chamber; a pressure fluid supply communicating with said second working chamber, said supply being functionally connected with said control valve so that the pressure in said supply is greater than the pressure in said connection except during an emergency application of the brakes at which time the pressure in said supply is dissipated at least in part, said expansible chamber motor permitting said yielding means to close said valves when the pressure in said supply is dissipated; and valve means operable to vent said second working space.

4. The combination defined in claim 3 in which said system includes an emergency reservoir and said emergency reservoir is said supply.

5. In combination with a fluid pressure brake controlling system of the type including a brake pipe, a control valve, a brake cylinder and a reservoir, said reservoir being charged from said brake pipe and caused by operation of the control valve to supply pressure fluid to said brake cylinder, a self-restoring brake-releasing mechanism for interposition between the brake cylinder connection of said brake control valve and said brake cylinder, said mechanism comprising a releasing valve having a normal position in which it affords communication between said brake cylinder connection and said brake cylinder, and an abnormal position to which it may be shifted and in which it seals said connection and isolates said brake cylinder therefrom; a normally inert pressure motor effective when actuated to maintain said valve in its abnormal position, said motor comprising a movable abutment having on opposite sides thereof a first and a second working space; a manually operated valve whereby said second working space and said brake cylinder may be vented at a restricted rate to actuate said motor; means affording a by-pass connection between said working spaces, a pilot valve in said by-pass connection effective when open to prevent actuation of said motor; yielding means urging said pilot valve toward its closed position; fluid pressure motor means comprising a movable member having on opposite faces thereof a first and a second working chamber, said first working chamber being in open communication with said brake cylinder connection; a source of pressure fluid connected to said second working chamber, said source being a component of said system and functionally connected with said control valve so that the pressure in said source is normally greater than the pressure in said brake cylinder connection but equalized with the pressure in said connection as an incident to an emergency application of the brakes, said motor means normally maintaining said pilot valve open but ineffective to overcome the bias of said yielding means at least when the pressure in said supply and said connection are equal.

6. A self-restoring brake releasing mechanism of the type adapted for interposition between the brake cylinder connection and the brake cylinder of a fluid pressure brake controlling system, said system including at least a brake pipe, a control valve, an auxiliary reservoir, an emergency reservoir, said brake cylinder connection and said brake cylinder, said releasing mechanism comprising a housing having therein two working spaces, the first of said working spaces being in constant communication with said connection; a movable abutment separating said spaces; a double-beat poppet valve shiftable between a normal and abnormal position, said valve being maintained in said abnormal position by said abutment when the second of said working spaces is vented, means biasing said valve toward normal position, said valve effective in normal position to permit flow between said connection and said cylinder and effective in said abnormal position to isolate said connection and vent said cylinder and said second working space; means to restrict the rate of venting flow from said second working space; manually operated means to shift said valve from normal to abnormal position; means affording a flow connection between said first working space and said second working space; a pilot valve effective to control flow through said flow connection; yielding means biasing said pilot valve to closed position; fluid pressure motor means when actuated maintaining said pilot valve open in opposition to the bias of said yielding means; said fluid pressure motor means including two working chambers separated from one another by a movable abutment, one of said chambers being in communication with said brake cylinder connection and the other chamber being supplied with pressure fluid from said emergency reservoir, said motor means being inert when the pressure in said emergency reservoir and said brake cylinder connection are equal.

WILLIAM F. KLEIN.

References Cited in the file of this patent

UNITED STATES PATENTS

| Number | Name | Date |
| --- | --- | --- |
| 2,293,778 | Sudduth | Aug. 25, 1942 |
| 2,322,823 | Brown | June 29, 1943 |
| 2,389,100 | Whitney | Nov. 13, 1945 |
| 2,392,185 | Pickert | Jan. 1, 1946 |